US012233297B2

(12) United States Patent
English

(10) Patent No.: US 12,233,297 B2
(45) **Date of Patent: *Feb. 25, 2025**

(54) TRIGGER ASSEMBLIES FOR AUTOMATIC FIRE PROTECTION SPRINKLERS

(71) Applicant: Minimax Viking Patent Management GmbH, Bad Oldesloe (DE)

(72) Inventor: Scott A. English, Hastings, MI (US)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/476,890

(22) Filed: Sep. 28, 2023

(65) Prior Publication Data

US 2024/0050791 A1 Feb. 15, 2024

Related U.S. Application Data

(63) Continuation of application No. 18/016,609, filed as application No. PCT/US2021/046170 on Aug. 16, 2021, now Pat. No. 11,813,490.

(60) Provisional application No. 63/067,552, filed on Aug. 19, 2020.

(51) Int. Cl.
*A62C 37/14* (2006.01)

(52) U.S. Cl.
CPC .................................... *A62C 37/14* (2013.01)

(58) Field of Classification Search
CPC .......... A62C 37/10; A62C 37/11; A62C 37/14
USPC ...................................................... 169/37, 58
See application file for complete search history.

(56) References Cited

U.S. PATENT DOCUMENTS

| | | | | |
|---|---|---|---|---|
| 4,957,169 A | | 9/1990 | Polan | |
| 4,987,957 A | | 1/1991 | Galaszewski | |
| 5,366,022 A | * | 11/1994 | Meyer .................... | A62C 37/08 169/37 |
| 5,669,449 A | * | 9/1997 | Polan ..................... | A62C 37/08 169/37 |
| 5,732,778 A | | 3/1998 | Tateno | |
| 5,967,238 A | | 10/1999 | Pepi et al. | |

(Continued)

FOREIGN PATENT DOCUMENTS

| | | |
|---|---|---|
| DE | 2909977 | 10/1980 |
| WO | WO2014/058479 | 4/2014 |

OTHER PUBLICATIONS

International Searching Authority, International Search Report and Written Opinion in International Appln. No. PCT/US2021/046170, Jan. 27, 2022, 13 pp.

(Continued)

*Primary Examiner* — Steven J Ganey
(74) *Attorney, Agent, or Firm* — Perkins Coie LLP

(57) ABSTRACT

Automatic fire protection sprinkler assemblies having a trigger assembly with a thermally responsive element and a yoke that seats and facilitates heat flow over the thermally responsive element. The yoke includes an elongate support member with a central region centered between two end portions with linear portions extending between the central region and the end portions. The yoke defines a heat impact region in which the end of the trigger assembly is received and seated. The yoke also provides a lateral access to define a fluid flow path in fluid communication with the heat impact region to facilitate heat flow over the thermally responsive element.

29 Claims, 10 Drawing Sheets

(56) References Cited

U.S. PATENT DOCUMENTS

| | | | | |
|---|---|---|---|---|
| 6,082,463 | A | 7/2000 | Ponte | |
| 6,367,559 | B1 * | 4/2002 | Winebrenner | A62C 37/11 169/37 |
| 6,669,111 | B2 | 12/2003 | Vinson et al. | |
| 7,201,234 | B2 | 4/2007 | Rogers et al. | |
| D546,414 | S | 7/2007 | Franson et al. | |
| 7,395,868 | B2 | 7/2008 | Sundholm et al. | |
| 7,712,218 | B2 | 5/2010 | Franson et al. | |
| 7,766,252 | B2 | 8/2010 | Jackson et al. | |
| 7,854,269 | B2 | 12/2010 | Franson et al. | |
| 8,151,462 | B2 | 4/2012 | Franson et al. | |
| 8,172,001 | B2 | 5/2012 | Tow et al. | |
| 8,746,356 | B1 | 6/2014 | Silva, Jr. et al. | |
| 8,789,615 | B2 | 7/2014 | Franson et al. | |
| 2013/0105605 | A1 | 5/2013 | Watson | |
| 2014/0076585 | A1 | 3/2014 | Abels et al. | |
| 2015/0297927 | A1 | 10/2015 | Pipe et al. | |
| 2017/0296852 | A1 | 10/2017 | Pipe | |
| 2018/0333599 | A1 | 11/2018 | Penden et al. | |

OTHER PUBLICATIONS

International Preliminary Examining Authority, International Preliminary Examination Report in International Appln. No. PCT/US2021/046170, Nov. 21, 2022, 20 pp.

Minimax Viking Patent Management GmbH, Extended European Search Report issued in European Application No. 21858908.3 on Jul. 30, 2024, 9 pages.

* cited by examiner

TRIGGER ASSEMBLIES FOR AUTOMATIC FIRE PROTECTION SPRINKLERS

PRIORITY DATA AND INCORPORATION BY REFERENCE

This application is continuation application of U.S. patent application Ser. No. 18/016,609, filed Jan. 17, 2023, which is 35 U.S.C. § 371 application of International Application No. PCT/US2021/046170, filed Aug. 16, 2021, claims the benefit of U.S. Provisional Patent Application No. 63/067,552, filed Aug. 19, 2020, each of which is incorporated by reference in its entirety.

TECHNICAL FIELD

The present invention relates generally to automatic fire protection sprinkler assemblies; and in particular, trigger assemblies for automatic fire protection sprinklers.

BACKGROUND ART

Fire protection sprinklers include a sprinkler frame body with an inlet connected to a pressurized supply of firefighting fluid, such as water, and some type of fluid deflection member spaced from an outlet of the frame body to distribute firefighting fluid discharged from the outlet in a defined spray distribution pattern over an area to be protected. In some fire protection sprinklers, the release of fluid discharge from the sprinkler body is provided by operation of a trigger assembly and a seal. For example, automatic fire protection sprinklers include a fusible or thermally responsive trigger assembly which secures a seal assembly over an internal central orifice formed proximate the outlet of the frame body. When the temperature surrounding the automatic sprinkler is elevated to a pre-selected value indicative of a fire, the trigger assembly operates, fractures or collapses to release the seal assembly; and fluid flow is initiated through the sprinkler body and out the outlet to impact the fluid deflection member. In contrast to the passive operation of the fusible or thermally responsive trigger assembly and seal assembly of an automatic fire protection sprinkler, other types of fire protection sprinklers have a controlled operation trigger assembly and seal assembly. For example, in such controlled operation, the trigger assembly and seal assembly is actuated in response to a control signal, and, in such actuated sprinklers, the trigger assembly and/or seal assembly is operated or otherwise ejected by a mechanical, electrical or computer-controlled actuator.

Thermally responsive trigger assemblies generally include a thermally responsive element having a nominal operating temperature and thermal sensitivity to define the thermal response of the sprinkler at which the sprinkler actuates in response to a fire. Nominal operating temperatures can range between 125° F. to 225° F. (52° C.-107° C.). Thermal sensitivity is characterized by Response Time Index ("RTI") and measured in units of $(ft·s)^{1/2}$ $[(m·s)^{1/2}]$. The RTI can range from 145-635 $(ft·s)^{1/2}$ [80 $(m·s)^{1/2}$ to 350 $(m·s)^{1/2}$] to define a "Standard Response Sprinkler" and an RTI equal to or less than 90 $(ft·s)^{1/2}$ [50 $(m·s)^{1/2}$] defines a "Quick Response Sprinkler." One type of thermally responsive element is a solder link and lever arrangement. U.S. Pat. No. 7,854,269 shows and describes a sprinkler assembly having a solder link and lever arrangement with one end of the arrangement seated against the sealing assembly and the opposite end seated against a compression member that is subjected to a compressive load.

Another type of thermally responsive element is the frangible glass bulb. The glass bulb is generally a liquid filled elongate glass tubular member that is centered and axially aligned in the sprinkler assembly with one end seated against the sealing assembly and the opposite end seated in place by a compression member. In the event of a fire, the liquid is heated and the glass bulb ruptures in accordance with its nominal operating temperature and thermal sensitivity. Despite operating within an accepted nominal operating temperature and sensitivity, it is believed that the structural nature of the glass tubes can result in variations from bulb to bulb of the manner in which the internal liquid is heated and the glass bulb ruptures. Accordingly, it is desirable to minimize or otherwise avoid any additional variations in the thermal operation of the frangible thermal element when it is incorporated into the complete sprinkler assembly.

U.S. Pat. No. 7,854,269 shows and describes a compression member in the form of an exemplary yoke for axially aligning a glass bulb trigger in a sprinkler assembly. Generally, the known yoke is a triangular wedge-shaped member having opposed supporting or loading surfaces centered perpendicularly about the sprinkler axis to seat and align the bulb along the sprinkler axis. Lateral sidewalls extend axially from the supporting surfaces to define an internal chamber with a single opening for inserting and seating the end portion of the glass bulb trigger. The bulb is inserted into the yoke chamber and seated against the internal supporting surface with threaded screw members acting on the opposite external support surface of the yoke to apply a compressive force on the bulb and the sealing assembly.

In the complete sprinkler assembly, the ends of the glass bulb are partially concealed by the sealing assembly and the yoke with the central shank portion of the bulb exposed for thermal detection and operation. The single opening in the yoke structure defines a single access or fluid flow path through which heat can flow in and out of the internal chamber. For sprinkler assemblies incorporating this known yoke structure, the heat flow over the inserted bulb end can be limited and/or uneven. Despite the acceptable performance of such sprinklers, the limited flow path for heat flow can add to the inherent variability in the thermal operation between different glass bulbs and their sprinkler assemblies. There remains a need for yoke structures for fire protection sprinkler assemblies that can maximize heat flow over the thermally responsive element to minimize or otherwise eliminate variations in the thermal operation between similarly constructed trigger and sprinkler assemblies over their nominal operating temperatures and sensitivities.

Trigger assemblies incorporating the known yoke structure have been shown to be used with a variety of fluid deflection members. Fluid deflection members of fire protection sprinkler assemblies can be formed to a variety of geometries to suit a given fire protection application. The deflection member geometries can be categorized into one of two types. One type of fluid deflection members presents a central abutment to the fluid discharge from the outlet opening and fans the fluid discharge radially and/or laterally. Such a deflector geometry is shown, for example, in U.S. Patent Application Publication No. 2015/0297927. An alternate type of deflection geometry defines an unencumbered fluid flow path. As used herein, an "unencumbered fluid flow path" provides for a fluid discharge column in which its central core is not impacted by any sprinkler structure and fanned radially. Instead, the fluid deflection member geometry acts on the periphery of the discharge column to direct the fluid stream in a desired manner Such a deflector geometry is shown, for example, in U.S. Pat. No. 7,854,269 or U.S. Pat. No. 8,662,190. In addition to maximizing heat flow over the thermally responsive element, it is also desirable for yoke structures to work with a variety of fluid deflection member geometries.

DISCLOSURE OF INVENTION

Preferred embodiments of an automatic fire protection sprinkler assembly are provided having a trigger assembly that is sufficiently strong enough to maintain a fluid tight seal of the sprinkler assembly and facilitate a more uniform heat flow over the thermally responsive element of the trigger assembly. Preferred embodiments of the trigger assembly include a yoke for seating a thermally responsive element preferably embodied as a frangible glass bulb. A preferred yoke includes an elongate support member with a central region centered between two end portions with linear portions extending between the central region and the end portions. The central region is axially spaced from the span such that the linear portions are skewed with respect to a central axis extending through the central axis of the yoke. Accordingly, preferred embodiments of the yoke are triangular and define a preferably triangular heat impact region in which the end of the trigger assembly is received and seated. Preferred embodiments of the yoke also provide a lateral access and more preferably a lateral window that defines a fluid flow path in fluid communication with the heat impact region and through which heat can flow into and out of the heat region to facilitate heat flow over the thermally responsive element. Generally, as used herein, a lateral access is an area parallel to a plane defined by the sprinkler axis and span that is disposed about the heat impact region of the yoke through which heat can flow. The area of the lateral access is bound at least partially by the yoke. Accordingly, the lateral access can be an open-ended area. Preferred embodiments of the lateral access are defined by a lateral window formed in the yoke and defined by a closed-formed geometry.

A preferred embodiment of a fire protection sprinkler assembly includes a sprinkler frame having a body defining an inlet, an outlet and an internal passageway extending along a central sprinkler axis from the inlet to the outlet. The body includes an internal sealing surface proximate the outlet, preferably formed along the internal passageway. A sealing assembly is disposed in the outlet and in fluid tight surface contact with the sealing surface of the frame body. A fluid deflection member is coupled to the sprinkler frame and spaced from the outlet.

The sprinkler assembly includes a preferred trigger assembly having a thermally responsive element embodied as a frangible glass bulb having a first end and a second end. Each of the first and second ends of the frangible glass bulb is preferably axially aligned along the central sprinkler axis with the first end engaged with the sealing assembly to support the sealing assembly in fluid tight surface contact with the internal sealing surface of the frame body. The trigger assembly includes a preferred yoke disposed between the sealing assembly and the fluid deflection member to seat the second end of the thermally responsive element. The yoke includes an elongate support member having a central region centered along the central axis and a pair of end portions preferably equidistantly disposed about the central region along a lateral axis extending perpendicular to the central sprinkler axis to define a span of the yoke therebetween. The elongate member defines a seating surface for seating the second end of the thermally responsive element along the central region to align the frangible glass bulb along the central sprinkler axis. A loading surface opposite the seating surface is provided for compressive loading preferably by at least one and more preferably a pair of compression members equidistantly about the central region. The loading surface preferably includes a first linear portion extending between the central region and one end portion and a second linear portion extending between the central region and another end portion with each of the first and second linear portions being skewed with respect to the central sprinkler axis at equal angles. The elongate support member defines a preferred heat impact region between the elongate support member and the span. The impact region preferably includes a lateral access defining a fluid flow path in fluid communication with the heat impact region.

A preferred method is provided for actuating a fire protection sprinkler having a body defining an inlet, an outlet and an internal passageway extending along a central sprinkler axis from the inlet to the outlet, a sealing assembly disposed in the outlet, a fluid deflection member and a trigger assembly disposed between the outlet and the fluid deflection member. The preferred method includes seating a first end of a frangible glass bulb of the trigger assembly against the sealing assembly and a second end of the frangible glass bulb within a heat impact region of a yoke of the trigger assembly disposed between the sealing assembly and the fluid deflection member; and impacting the frangible glass bulb with heat flowing along a fluid flow path defined by a lateral access of the yoke and in fluid communication with the heat impact region.

Another preferred embodiment of a sprinkler assembly includes a sprinkler frame having a body defining an inlet, an outlet and an internal passageway extending along a central sprinkler axis from the inlet to the outlet with a sealing surface formed proximate the outlet. A fluid deflection member coupled to the sprinkler frame and spaced from the outlet. A sealing assembly is disposed in the outlet and in fluid tight surface contact with the sealing surface of the frame body. The preferred assembly includes a trigger assembly having a thermally responsive element aligned along the central sprinkler axis with a first end seated against the sealing assembly and a second end seated between the outlet and the fluid deflection member; and a yoke disposed between the sealing assembly and the fluid deflection member. The yoke includes a preferred elongate support member having a central region centered between a pair of end portions. The pair of end portions are spaced apart from one another to define a span of the yoke and the central region is axially spaced from the span to define a height of the yoke. The central region is centered along the central axis for seating the second end of the thermally responsive element under a compressive load with the pair of end portions disposed about the thermally responsive element along a lateral axis intersecting and perpendicular to the central axis to define a preferred heat impact region with the second end of the thermally responsive element disposed therein. The yoke preferably radially surrounds the thermally responsive element. Moreover, the preferred yoke preferably includes a lateral access between the central region and the pair of end portions to define a fluid flow path in fluid communication with the heat impact region and perpendicular to a plane defined by an intersection of the central and lateral axis.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1A:
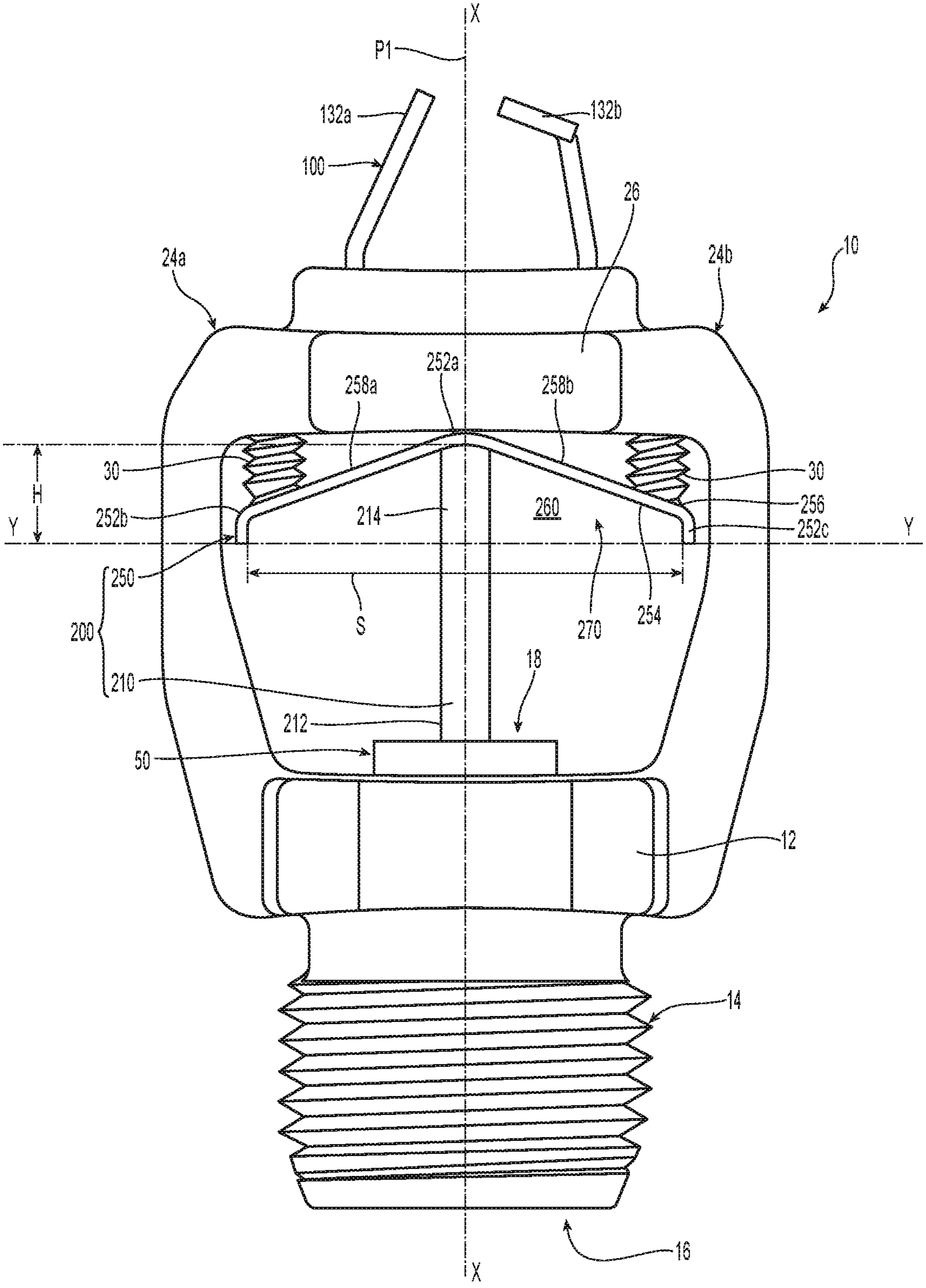
FIG. 1A is an illustrative side view of an automatic fire protection sprinkler assembly having a preferred trigger assembly that includes a preferred yoke for seating a thermally responsive element.
Figure 1B:
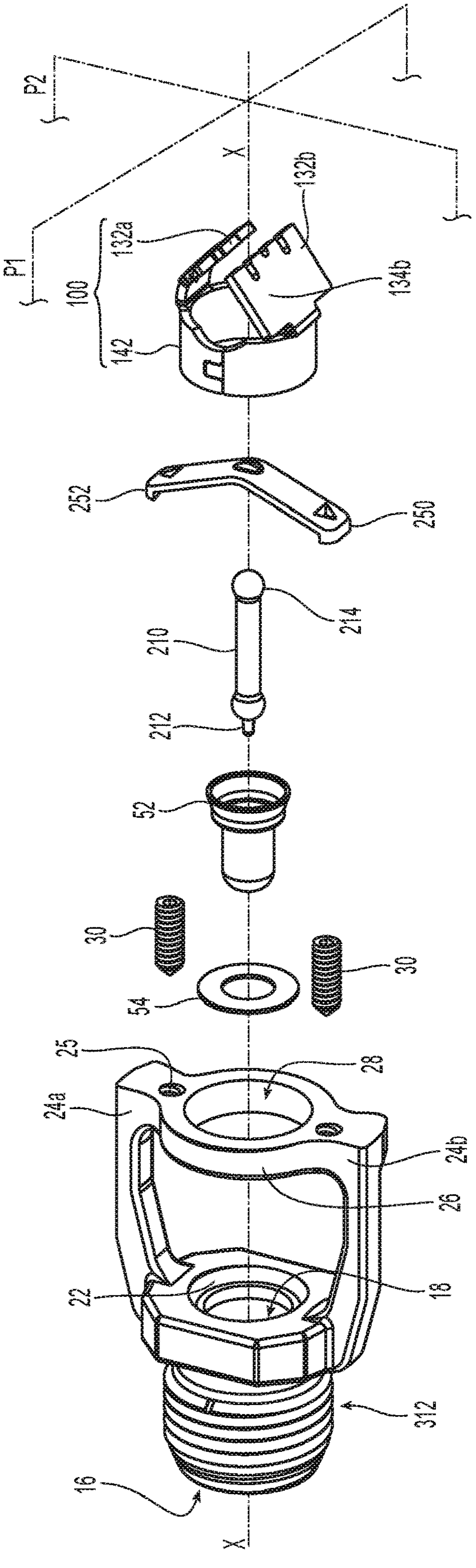
FIG. 1B is a perspective exploded view of the sprinkler assembly of FIG. 1A.

Shown in FIGS. 1A and 1B is a preferred embodiment of an automatic fire protection sprinkler assembly 10. Preferred embodiments shown herein are configured as a horizontal sidewall type sprinkler, but it should be understood that alternate embodiments of the assembly 10 can be configured for different orientations and installations such as, for example, pendent, upright, or drop down concealed. The preferred sprinkler assembly 10 includes a sprinkler frame 12, a sealing assembly 50, a fluid deflection member 100, and a preferred trigger assembly 200 axially aligned with one another along a central sprinkler axis X-X. The trigger assembly 200 is preferably disposed between the frame outlet 18 and the fluid deflection member 100. In preferred embodiments, the trigger assembly 200 includes a thermally responsive element 210 that is preferably axially aligned along the sprinkler axis X-X and a preferred yoke 250 for seating the thermally responsive element 210 in the sprinkler assembly 10. Preferred embodiments of the preferred yoke 250 define a structure to maximize the surface exposure of the thermally responsive element over which heat can flow to initiate a full and timely thermal response.

The frame 12 includes a preferred body 14 having a fluid inlet 16 and outlet 18 with an internal passageway 20 extending coaxially along the sprinkler axis X-X between the inlet 16 and the outlet 18. The sprinkler 10 is an automatic sprinkler in which fluid discharge from the sprinkler assembly is regulated by the thermally responsive trigger assembly 200. The trigger assembly 200 defines an unactuated state of the sprinkler assembly 10 in which the trigger assembly 200 supports a seal assembly 50 within the outlet 18 to form a fluid tight seal at a preferred internal sealing surface 22. Upon thermal operation of the trigger assembly 200 in response to a level of heat indicative of a fire, an actuated state of the sprinkler assembly 10 is defined in which support of the seal assembly 50 has been removed. Without the support of the trigger assembly 200, the seal assembly 50 can be displaced or translate out of contact with the internal sealing surface 22 under the fluid pressure delivered to the inlet 16 and/or an internal spring that biases the seal assembly 50 out of contact with the internal sealing surface 22. In the actuated state of the sprinkler assembly 10, firefighting fluid is discharged out of the outlet 18 for effective fluid distribution fire protection by the fluid deflection member 100 affixed to the frame 12 preferably at a fixed distance from the outlet 18.

In the unactuated state of the sprinkler assembly 10, one end of the thermally responsive element 210 is seated against a preferred yoke member 250 preferably at a fixed distance from the outlet 18 as shown in FIG. 1 to transfer a compressive load to the seal assembly 50 and form the sealed surface contact with the internal sealing surface 22. In preferred embodiments of the assembly, the thermally responsive element 210 is a thermally responsive frangible glass bulb having one end 212 seated against the sealing assembly 50 and another end 214 seated against the preferred yoke 250 with the bulb 210 and its ends 212, 214 disposed along central the sprinkler axis X-X.

The yoke 250 is preferably disposed between the fluid deflection member 100 and the sealing assembly 50 coaxially centered along the central sprinkler axis X-X. Preferably, the yoke 250 has an elongate support member 252 having a central region 252*a* centered along the central axis and a pair of end portions 252*b*, 252*c* equidistantly disposed about the central region 250*a* along a lateral axis Y-Y that extends perpendicular to the central sprinkler axis X-X to define a span S of the yoke therebetween. The elongate member 252 has a seating surface 254 for seating the second end 214 of the thermally responsive element 210 along the central region 252*a* and align the thermally responsive element 210 along the central sprinkler axis X-X. Opposite the seating surface 254 is a loading surface 256 of the elongate support member 252 that is configured for compressive loading by at least one compression member 30 and more preferably by a pair of compression members 30 equidistantly about the central region 252*a* and the trigger element 210. The seating surface 254 and the loading surface 256 are preferably parallel to one another over the length of the elongate support member 252 from end portion 252*b* to end portion 252*c*. The seating surface 254 and the loading surface 256 define a preferred material thickness therebetween of less than 0.1 inch and more preferably less than 0.05 inch and even more preferably between 0.03-0.05 inch. In preferred embodiments of the yoke 250, the loading surface 256 includes a first linear portion 258*a* extending between the central region 252*a* and the first end portion 252*b* and a second linear portion 258*b* extending between the central region 252*a* and the second end portion 252*c*. Each of the first and second linear portions 258*a*, 258*b* are preferably skewed with respect to the central sprinkler axis X-X at equal angles. Accordingly, preferred embodiments of the yoke described herein provide a preferred support structure of sufficient strength for maintaining the unactuated and fluid tight sealed state of the sprinkler assembly 10 with the thermally responsive element 210 centered along the central sprinkler axis and opposed by equidistantly located compressive members 30. Preferred embodiments of the yoke are preferably formed from a copper alloy, more preferably a bronze copper alloy and even more preferably a phosphor bronze copper alloy.

As described herein, preferred embodiments of the yoke 250 and its elongate support member 252 define a heat impact region 260 between the seating surface 254 of the elongate support member 252 and the span S between the end portions 252*b*, 252*c*. The second end 214 of the thermally responsive element 210 is preferably seated and centered within this heat impact region 260. Preferred embodiments of the yoke 250 include a lateral access 270 defining a fluid flow path in communication with the heat impact region 260. Heat can flow along the fluid flow path and in and out of the lateral access 270 to impact the heat impact region 260 and the thermally responsive element 210 and in particular, impact the end portion 214 of the thermally responsive element 210. Accordingly, the preferred yoke provides multiple paths by which heat can flow over the thermally responsive element 210. The preferred lateral access 270 extends parallel to the sprinkler axis X-X and is disposed about the heat impact region 260 to define the area through which heat can flow. More preferably, the yoke 250 defines the lateral access 270 by an area parallel to a plane defined by the intersection of the central axis X-X and lateral axis Y-Y through which the heat can flow. Accordingly, the lateral access defines a preferred fluid flow path that extends perpendicular to the defined plane. In some preferred embodiments of the yoke 250, the area of the lateral access 270 is at least 75% of the area of the heat impact region 260, preferably at least 85%-95% of the area of the heat impact region 260 and even more preferably 100% of the area of the heat impact region 260. For example, in the preferred embodiment of the yoke 250 shown in FIGS. 1A and 1B in which the yoke 250 consists only of the elongate support member 252, the sloped portions 258*a*, 258*b* define a preferred height H between the central region 252*a* and the preferred span S between the end portions 252*b*, 252*c*. The lateral area of the heat impact region 260 is substantially triangular which can be defined by an area formula of one-half of the height H multiplied by the span S (½×H×S). In the embodiment shown, the lateral access area 270 is an open-ended area framed partially by the elongate support member 252 and equal in size to the lateral area of the heat impact region 260.

Figure 2A:
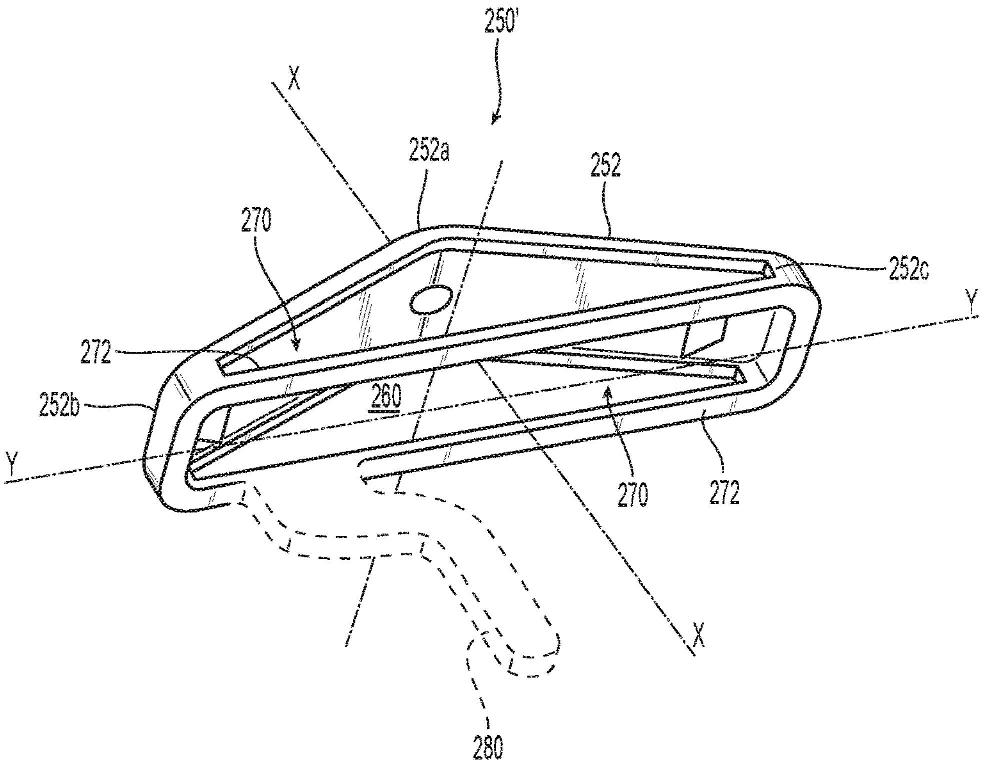
FIGS. 2A-2B are various views of another preferred embodiment of a yoke for use in the trigger assembly of the sprinkler assembly in FIG. 1A.
Figure 2B:
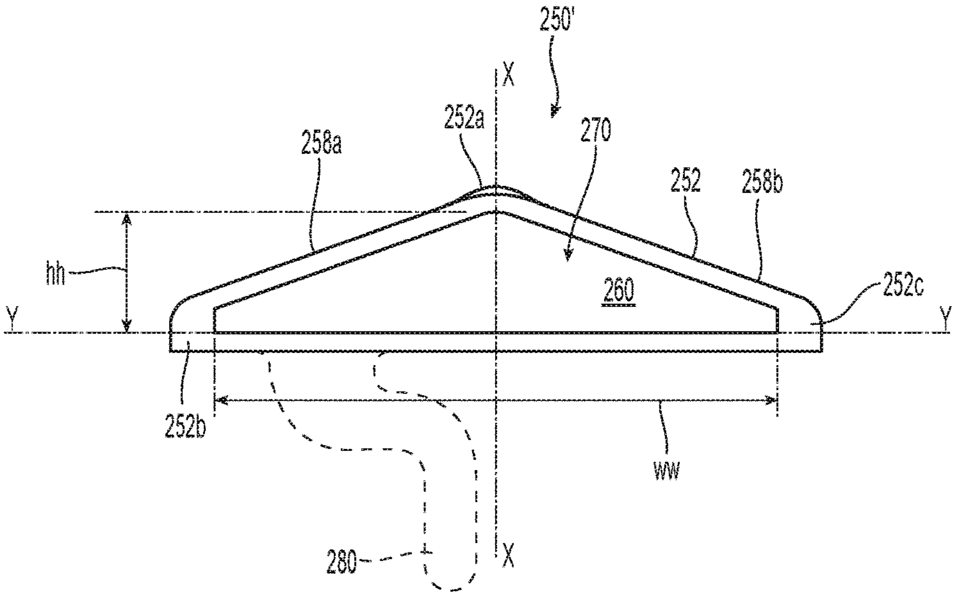

Preferred embodiments of the yoke 250' are embodied as an elongate triangular member as seen, for example, in FIGS. 2A-2B, with the linear portions 258*a*, 258*b* extending respectively between the central region 252*a* and the end portion 252*b*, 252*c*. More preferably, the elongate triangular yoke has a geometry of an isosceles triangle with a vertex angle defined by the central region 252*a* and the pair of base angles defined by the end portions 252*b*, 252*c*. The yoke 250' includes a pair of cross members 272 disposed about the elongate member 252 that extend across the span S and parallel to the lateral axis Y-Y to interconnect the end portions 252*b*, 252*c*. Each of the cross members 272 with the elongate member 252 preferably frame a lateral access 270 of the yoke 250'. In such an embodiment of the yoke, the lateral access 270 is more preferably embodied as a pair of lateral windows 270 that are disposed about the thermally responsive element 210 in the sprinkler assembly 10. Accordingly, the lateral windows 270 configure the lateral access as a closed-form geometry through which heat can flow in and out of to impact the heat impact region 260. Moreover, the elongate support member 252 with the cross members 272 radially surround the thermally responsive element 210 and locate the second end portion 214 of the thermally responsive element in the second heat impact region 260. Each of the lateral windows 270 define a preferred triangular geometry with a width ww that that is preferably, at its maximum, 75%-90% of the yoke span S and/or a void height hh that is 50%-75% of the yoke height H. Accordingly, each lateral window 270 is preferably at least 75% of the area of the impact region 260 and more preferably at least 85-95% of the area of the impact region. In addition to framing the windows 270, the cross members 272 strengthen the yoke structure.

Figure 3A:
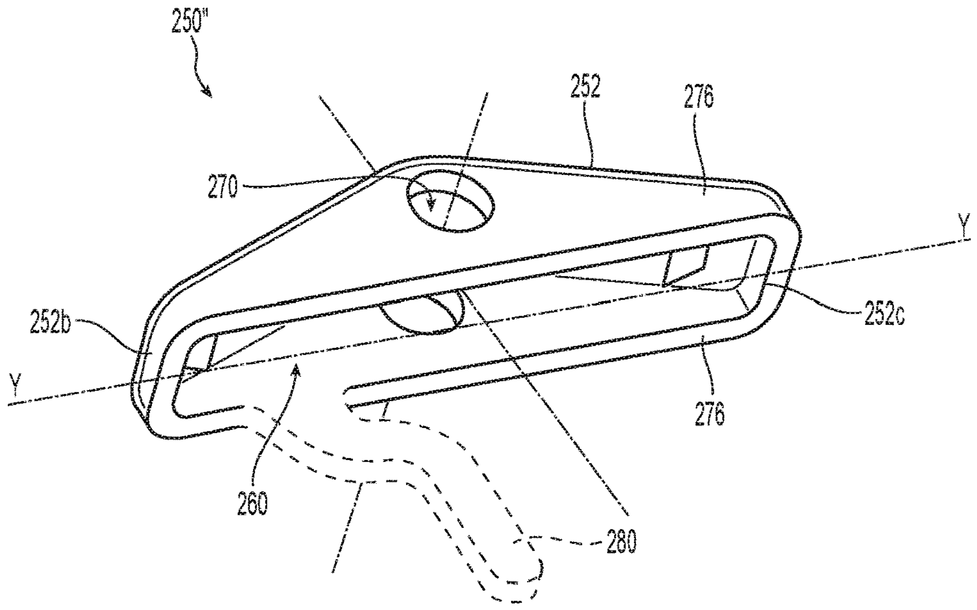
FIGS. 3A-3B are various views of another preferred embodiment of a yoke for use in the trigger assembly of the sprinkler assembly in FIG. 1A.
Figure 3B:
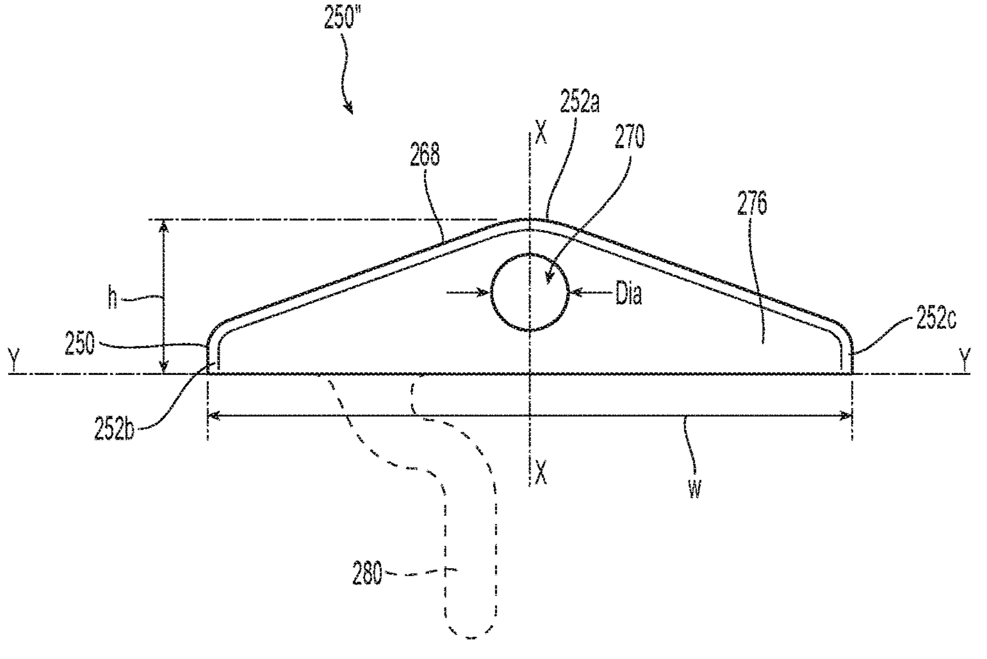

In alternate preferred embodiments of the yoke described herein, the area of the lateral window 270 is preferably less than 75% area of the heat impact region 260, preferably less than 50% area of the heat impact region 260, more preferably less than 30% area of the heat impact region 260 and even 25% or less than the area of the heat impact region 260. With reference to FIGS. 3A-3B, the yoke 250" has a peripheral wall 276 that borders the heat impact region 260 to preferably radially surround the thermally responsive trigger element 210 and receive the second end portion 214 of the thermally responsive element 210. The peripheral wall 276 preferably includes one or more apertures in the wall 276 to define the lateral window 270 for heat to flow therethrough. Accordingly, in the event of a fire, heat can enter into and exit from the impact heat region through the lateral window 270 and heat the second end portion 214 of the thermally responsive element 210. In preferred embodiments of the triangular yoke 250, the peripheral wall 276 includes a pair of sidewalls 276 extending axially parallel one another about the end portions 252*b*, 252*c*. As shown in FIG. 3B, the height h and width w of the peripheral wall 276 define the preferred triangular area of the heat impact region 260. Each of the sidewalls 276 preferably has a lateral window 270 framed therein. The lateral windows 270 are defined by closed-form geometries; and in one preferred embodiment, the closed form geometries are circular each defining a diameter Dia being 25%-33% of the sidewall width w and/or 50%-75% of the sidewall height h. Alternatively or additionally, the diameter Dia of the circular window 270 can be 25%-33% of the yoke span S and/or 50%-75% of the yoke height H. As shown, the lateral windows 270 are preferably coaxially aligned with one another along an axis perpendicular to the sprinkler axis X-X and centered laterally on each of the sidewalls 276 between the end portions 252*b*, 252*c* of the yoke 250". Alternatively, the lateral windows 270 can be off-set from one another and/or off-set from the central sprinkler axis X-X.

Figure 4A:
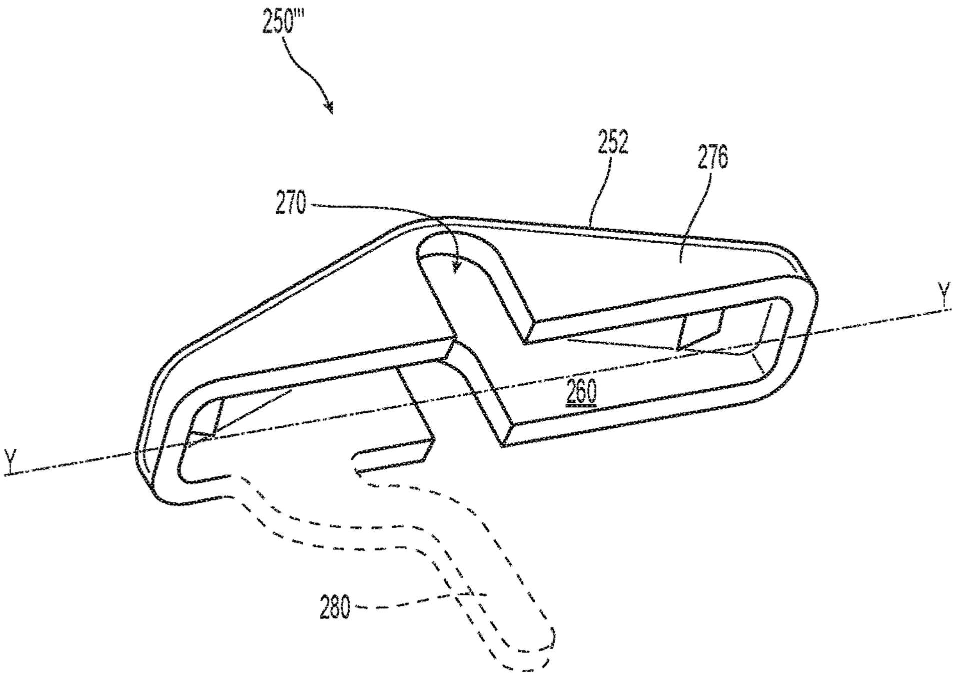
FIGS. 4A-4B are various views of yet another preferred embodiment of a yoke for use in the trigger assembly of the sprinkler assembly in FIG. 1A.
Figure 4B:
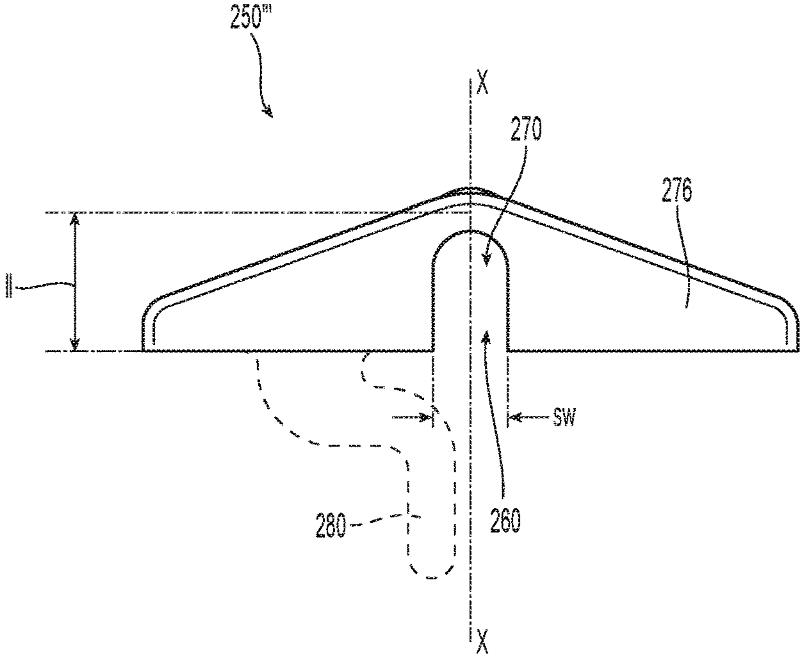

Shown in FIGS. 4A and 4B is an alternate embodiment of the yoke 250''' in which the lateral access 270 of the yoke 250''' are defined by an open-ended lateral slot which extends preferably axially parallel to the sprinkler axis X-X from the edge of the peripheral wall 276 toward the central vertex portion 252*a*. Each lateral slot 270 preferably defines an axial length ll that is 50%-75% of the yoke height H. Moreover, the lateral slot 270 preferably defines a slot width sw that is 25%-50% of the yoke span S. Alternatively or additionally, each lateral slot 270 defines an axial length ll that is 50%-75% of the peripheral wall height with the slot width sw being 25%-50% of the peripheral wall width. Preferred embodiments having a pair of opposed lateral slots 270, the lateral slots are preferably coaxially aligned with one another along an axis perpendicular to the sprinkler axis X-X and centered laterally on each of the sidewalls 252*a*, 252*b* between the end portions 252*b*, 252*c* of the yoke 250'''. Alternatively, the lateral slots 270 can be off-set from one another and/or off-set from the central sprinkler axis X-X.

In addition to the lateral access formations of the yoke, the crossmembers or peripheral walls of the yoke can include structures to facilitate its ejection out of the fluid flow path of the sprinkler assembly. For example, as shown in each of the embodiments of FIGS. 2A-2B, 3A-3B and 4A-4B, the yoke includes a lever member 280 that extends axially away from the central region 252*a* and more particularly would extend toward the outlet 18 in the sprinkler assembly 10. The lever member is preferably configured and located along the crossmember or peripheral wall to offset the center of gravity of the yoke 250 from the central sprinkler axis X-X and facilitate displacement of the yoke out of the fluid flow path.

Figure 5A:
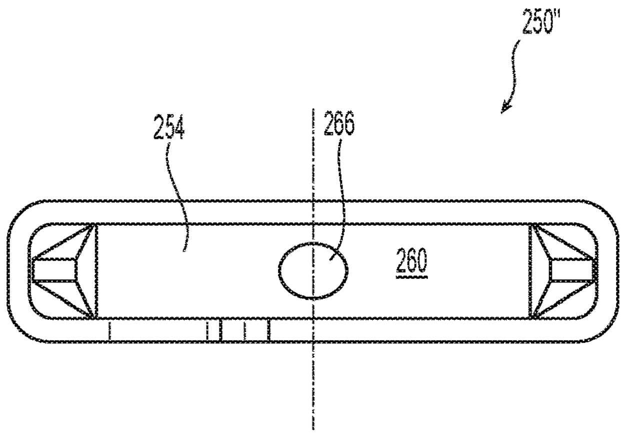
FIGS. 5A-5B are various plan views of an elongate support member for use in any one of the yokes in FIGS. 1A-1B; 2A-2B; 3A-3B and 4A-4B.
Figure 5B:
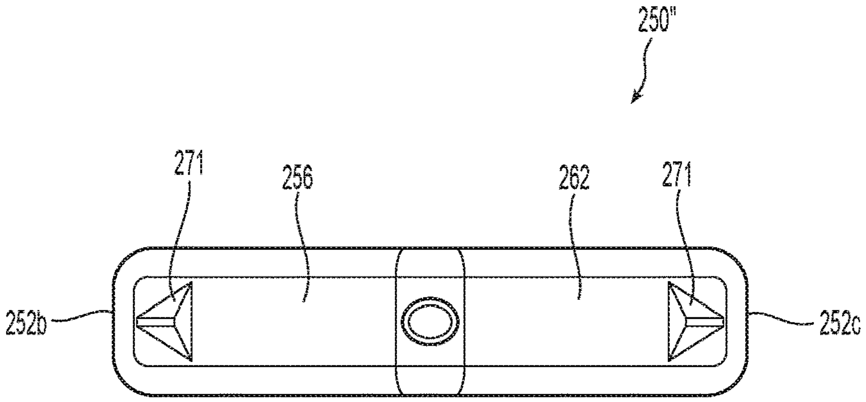

Shown in FIG. 5A is an illustrative seating surface 254 and in FIG. 5B is an illustrative loading surface 256 of the elongate member 252 in the yoke 250'' or any other preferred yoke described herein. To seat the thermally responsive bulb 210, the seating surface 254 preferably includes a recess 266 for receiving the second end 214 of the bulb 210 in a surface contact engagement. As shown in FIG. 5B, the loading surface 256 preferably includes two recesses 271 proximate the end portions 252*b*, 252*c* for receipt of a compression member 30 in a manner described herein for transfer of a compressive force from the trigger assembly 200 to the sealing assembly 50 to place the sealing assembly 50 in fluid tight surface contact with the internal sealing surface in the unactuated state of the sprinkler assembly 10.

Preferred embodiments of the sprinkler assembly 10 provide for an unencumbered fluid flow path from the outlet opening 18 to the fluid deflection member 100. Upon proper thermal actuation of the trigger assembly 200 and ejection of the seal assembly 50, an unencumbered fluid column is discharged from the outlet 18 and acted on at its outer surface or periphery by the fluid deflection member 100 to direct or shape the fluid flow in a desired manner to produce the fluid distribution for effective sprinkler fire protection. The preferred fluid deflection member 100 can be configured similarly to the flow-shaping member as shown and described in any one of U.S. Pat. Nos. 8,662,190; 8,151,462; 7,854,269 and 7,712,218. Alternatively, the fluid deflection member 100 can be configured with the geometry shown in U.S. Patent Application Publication No. 2015/0297927.

Preferred embodiments of the fluid deflection member 100 generally include a first tab member 132*a* and a second tab member 132*b*. With reference to FIGS. 1B, the first and second tabs 132*a*, 132*b* are opposed from one another about a dividing plane P1 that preferably extends perpendicular to the plane P2 defined by the intersection of the central longitudinal sprinkler axis X-X and the lateral axis Y-Y. In another preferred aspect, each of the first and second tabs 132*a*, 132*b* are preferably symmetrical about the second plane P2 that intersects and is perpendicular to the first dividing plane P1. The bisecting plane P2 is preferably defined by or parallel to the plane defined by the intersection of the central longitudinal sprinkler axis X-X and the lateral axis Y-Y.

Figure 6A:
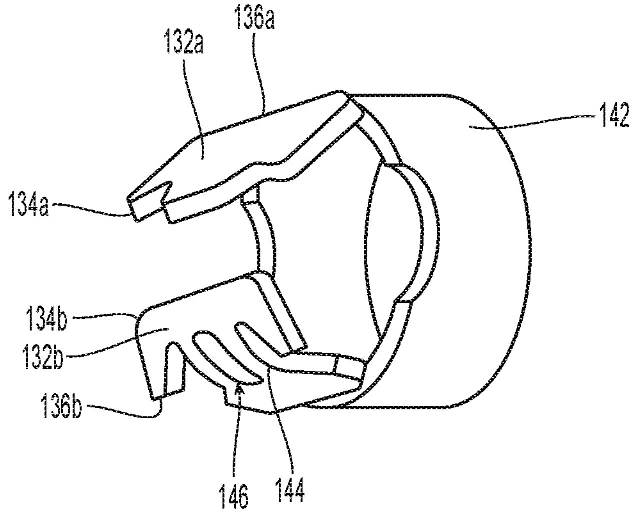
FIGS. 6A-6B are various views of a preferred embodiment of a fluid deflection member for use in the sprinkler assembly of FIG. 1A.
Figure 6B:
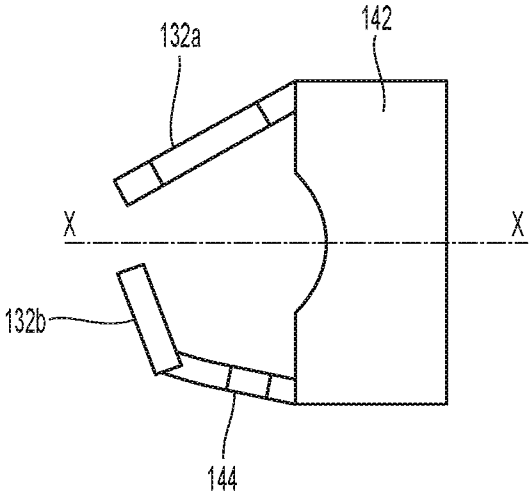
Figure 7A:
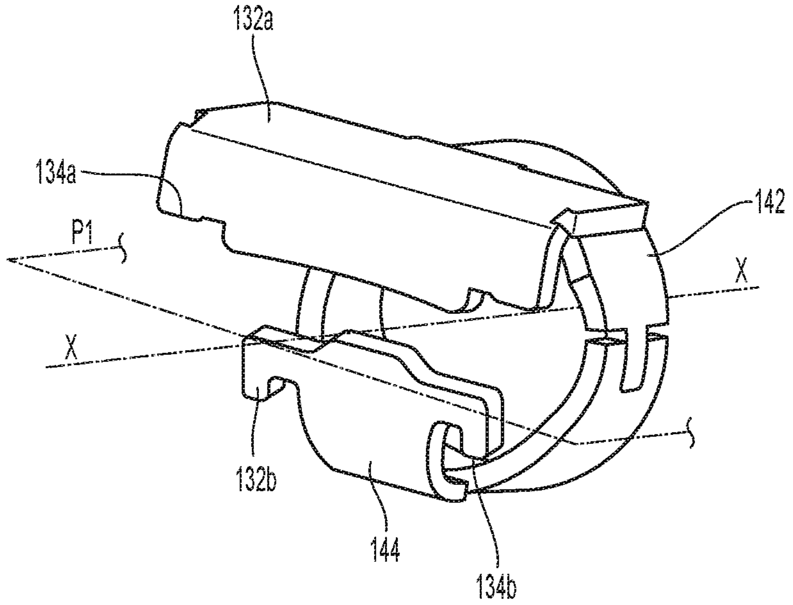
FIGS. 7A-7B are various views of another preferred embodiment of a fluid deflection member for use in the sprinkler assembly of FIG. 1A.

As illustratively seen in FIG. 6A and FIG. 6B, each of the tabs 132*a*, 132*b* are preferably angled with respect to the sprinkler axis X-X to present inwardly facing fluid flow surfaces. Each of the preferred first and second tabs 132*a*, 132*b* have a leading edge 134*a*, 134*b* and a trailing edge 136*a*, 136*b* with fluid flow surfaces extending therebetween. Each of the first and second tabs 132*a*, 132*b* are angled and more preferably skewed with respect to the central longitudinal sprinkler axis X-X so that the leading edge 134*a*, 134*b* is radially inward of the trailing edge 136*a*, 136*b*. The angle of the tabs 132*a*, 132*b* preferably taper the unencumbered fluid flow path. Each of the tabs 132*a*, 132*b* define a preferred included angle with the central longitudinal sprinkler axis X-X. In preferred embodiments, the included angles range from thirty degrees to sixty degrees)(30°--60°. The included angles of the tabs can be the same or different. In one preferred embodiment, the first tab 132*a* defines a preferred included angle ranging from 35°--40°. The second tab 132*b* preferably defines a different included angle ranging from 30°--50°. In alternate embodiments of the fluid deflection member as shown, for example, in FIGS. 7A and 7B, the tabs 132*a*, 132*b* can define alternate included angles with respect to the sprinkler central axis X-X. In the preferred embodiment shown, the first tab member 132*a* includes a first planar portion 133*a* parallel to the first plane P1 and a second planar portion 133*b* perpendicular to the first plane P1.

Figure 10:
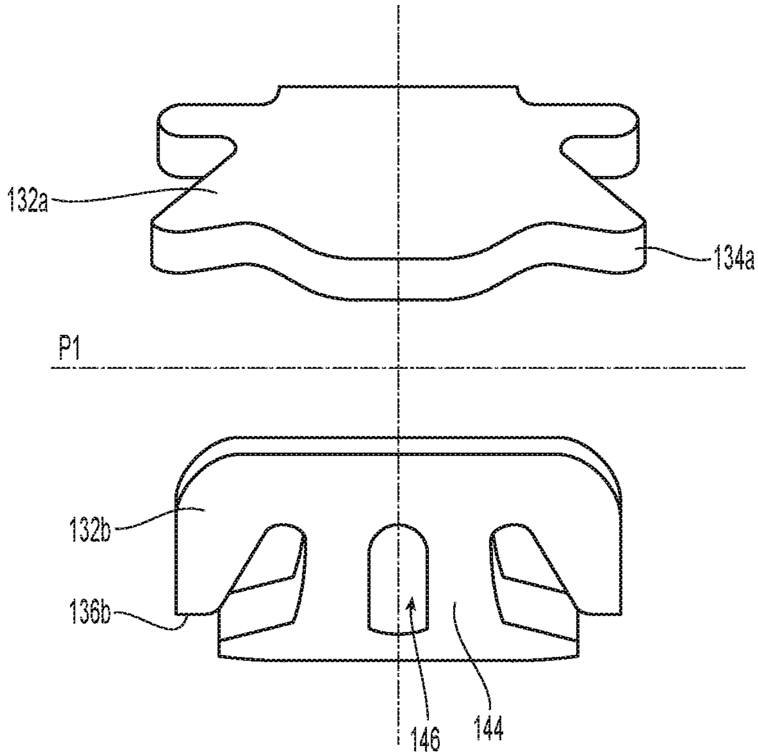
FIG. 10 is a partial frontal view of yet another preferred embodiment of a fluid deflection member for use in the sprinkler assembly of FIG. 1A.

The tabs 132*a*, 132*b* and their edges each define a preferably polygon-shaped geometry with features that can be similar to one another. For example, each of the preferred tabs 132*a*, 132*b*, can have parallel lateral edges that extend perpendicularly between the leading and trailing edges as seen for example in the embodiments of FIGS. 6A, 7A, 8 and 9. As shown in an alternate embodiment of the deflection member in FIG. 10, the lateral edges of either of the first or second tabs 132*a*, 132*b* can be skewed with respect to one another so as to diverge in the direction from the trailing edges to the leading edge. The spacing between the lateral edges define the width of the tabs 132*a*, 132*b* with the length of the lateral edges defining the length of the tabs 132*a*, 132*b*. The widths of the tabs 132*a*, 132*b* may be similar or alternatively vary from one another. In a preferred fluid deflection member 100, the leading edge 134*b* of the second tab 132*b* preferably defines a width smaller than the leading edge 134*a* of the first tab 132*a*.

Figure 7B:
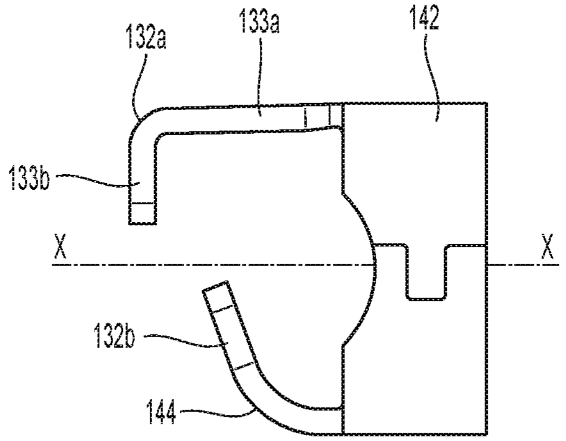
Figure 8:
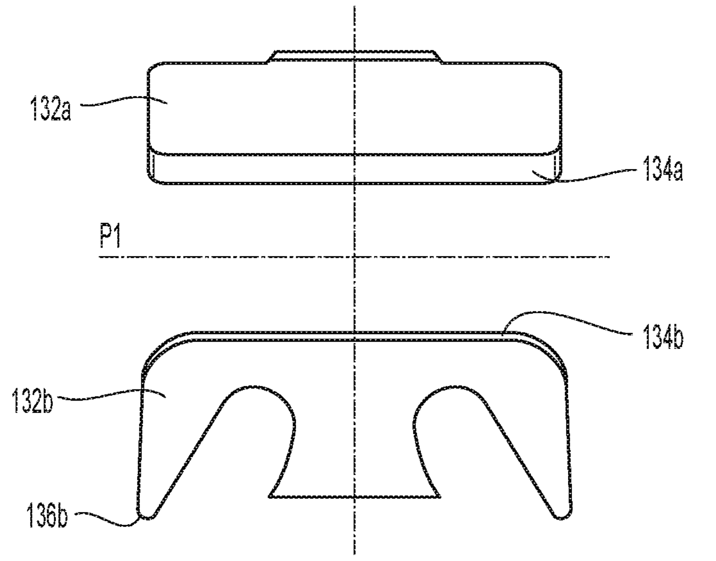
FIG. 8 is a partial frontal view of another preferred embodiment of a fluid deflection member for use in the sprinkler assembly of FIG. 1A.
Figure 9:
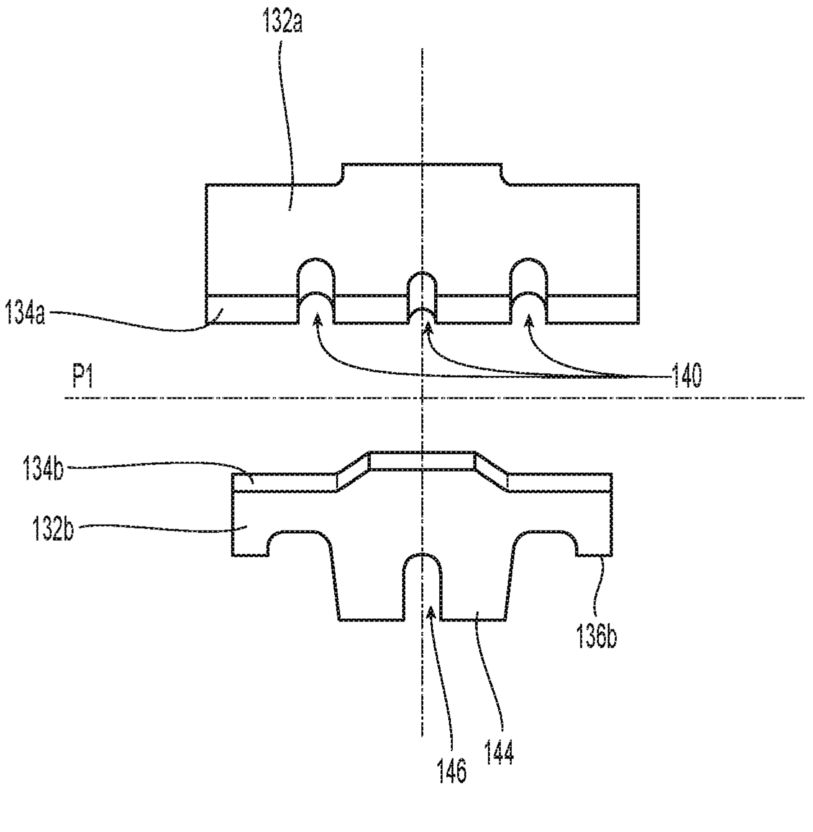
FIG. 9 is a partial frontal view of yet another preferred embodiment of a fluid deflection member for use in the sprinkler assembly of FIG. 1A.

More preferably, the tabs 132*a*, 132*b* are geometrically configured differently with respect to a variety of features. For example, the linear edge of one tab can be closer to the dividing plane P1. The leading edges 134*a*, 134*b* can have a constant distance in between to define a constant distance from the first plane P1. Alternatively, the leading edges 134*a*, 134*b* can have a variable spacing. For example, as seen in the embodiments of the deflection member shown in FIGS. 6A and 6A, the linear edges 134*a* of the first tabs 132*a* can have a central linear edge portion with two lateral linear edge portions disposed about the central portion. Alternatively or additionally, the leading edge of one tab member can be further from the sprinkler outlet 18 than the leading edge of the other tab member in the sprinkler assembly. The preferred embodiment of the fluid deflection member in FIG. 7B shows the leading edge 134*a* of the first tab 132*a* further axially outward than the leading edge 134*b* of the second tab 132*b*. In the sprinkler assembly 10, such a fluid deflection member is affixed to the sprinkler frame 12 with the leading edge 134*a* of the first tab 132*a* further from the outlet 18 than the leading edge 134*b* of the second tab 132*b*.

Each of the tabs 132*a*, 132*b* can include one or more slots. For example, in the embodiment of the fluid deflection member shown in FIG. 9, the leading edge includes a group of open-ended slots 140. Each of the open-end slots 140 initiate from and extend from the leading edge 134*a* in a direction perpendicular to the leading edge 134*a* to terminate at a terminal end of the slot 140. Alternatively, one or more of the open-end slots 140 can be skewed with respect to the bisecting plane P2. The plurality of open-end slots 140 preferably includes a central slot with two lateral slots disposed equidistantly about the central slot. The lateral slots each have a slot length that is preferably greater than the slot length of the central slot. Moreover, in another preferred aspect, as seen for example in any one of the embodiments of the fluid deflection member shown in FIG. 6A, 7A or FIGS. 8-10, the trailing edge 136*b* of the second tabs 132*b* includes a pair of open-ended slots disposed about the bisecting plane P2 that initiate from the trailing edge toward the leading edge 134*b* of the second tab 132*b*.

The tabs 132*a*, 132*b* can be individually affixed to the sprinkler frame 12. More preferably, the deflection member 100 includes an annular base 142 that is integrally formed with each of the tabs 132*a*, 132*b* for connection to the frame 102. One or both of the tabs 132*a*, 132*b* can be connected to the annular base 142 by a connector 144. For example, as seen in the embodiments of FIGS. 6A-6B, and 7A-7B are preferred connectors 144 interconnecting the second tab 132*b* to the annular base 142. Preferred embodiments of the central connector 144 include a central closed form slot 146 that extends axially parallel to the second bisecting plane P2.

With reference to FIGS. 1A and 1B, to locate the fluid deflector member 100 with respect to the outlet 18, the frame 12 preferably includes a pair of frame arms 24*a*, 24*b* that are diametrically opposed about the body 14 and the outlet opening 18 and extend axially away therefrom. The frame arms 24*a*, 24*b* preferably terminate and are joined to one another by an annular boss 26 circumscribed about a preferred frame void 28 centered about the central sprinkler axis X-X and through which the preferred unencumbered fluid flow path extends. The fluid deflection member 100 is affixed to or integrally formed with the preferred annular boss 26. Accordingly, the annular base 142 of the fluid deflection member 100 is dimensioned to be centered within the annular boss 26 and moreover is preferably dimensioned to define and maintain the unencumbered fluid flow path of the sprinkler assembly 10. The fluid deflection member 100 can be oriented with respect to the frame arms 27*a*, 27*b*. In particular, the tabs 32*a*, 32*b* can be located so as to be perpendicular to the frame arms 27*a*, 27*b*. In such an arrangement, the frame arms 27*a*, 27*b* are preferably disposed in and aligned with one another along the bisecting second plane P2 which extends perpendicular to the first dividing plane P1, as seen in FIG. 1B. In an installation of such a sprinkler assembly 10, the first plane P1 is oriented parallel to the floor or ceiling with the first tab 132*a* above the second tab 132*b* and the frame arms 24*a*, 24*b* vertically aligned with one another and the second plane P2 disposed perpendicular to the floor or ceiling. In alternate arrangements, the frame arms 24*a*, 24*b* are aligned in the first dividing plane P1 so that the each of the frame arms 24*a*, 24*b* are equidistantly located from either the ceiling or floor upon installation of the sprinkler assembly 10.

Regardless of the orientation of the frame arms 24*a*, 24*b*, the preferred yoke 200 and its end portions are preferably aligned with the pair of frame arms 24*a*, 24*b* and accordingly parallel to or perpendicular to the first plane P1. The yoke 250 is positioned to transfer a compressive sealing force to the sealing assembly 50 for forming a fluid tight surface engagement with the sealing surface 22 of the frame body 14. Preferably, threaded through bores 25 are formed at the terminal end formations of the frame arms 24*a*, 24*b* radially outside the annular frame boss 26. Compression members 30 are threaded into threaded bores 25 to apply a compressive force to the end portions of the yoke 250 and transferred to the thermally responsive bulb 210. The seal assembly 50 preferably includes a cap 52 with an appropriate seat for seating the end 212 of the bulb 210. The seal assembly 50 also preferably includes a sealing disc 54 to form the fluid tight engagement with the sealing surface of the frame body 14. As shown, the sealing disc 54 can receive the cap 52 and directly engage the sealing surface. Alternatively, the sealing disc can be disposed within the cap 52 to form the fluid tight engagement under the compressive force. The disc 54 is preferably a spring member to bias the sealing assembly 50 away from the sealing surface 22 to facilitate opening of the sprinkler assembly once the trigger assembly 200 actuates and the thermally responsive element fractures.

The thermally responsive element 210 has a nominal operating temperature and thermal sensitivity to define the thermal responsiveness of the sprinkler at which the sprinkler actuates in response to a fire. In preferred embodiments of the sprinkler assembly 10, the trigger 210 has a preferred nominal operating temperature rating that ranges between 125° F. to 225° F. (52° C.-107° C.) and more preferably is any one of: 155° F. (68° C.); 175° F. (79° C.) or 200° F. (93° C.). The thermal sensitivity of a trigger assembly and sprinkler is measured or characterized by Response Time Index ("RTI"), measured in units of $(ft\cdot s)^{1/2}$ $[(m\cdot s)^{1/2}]$. An RTI of 145-635 $(ft\cdot s)^{1/2}$ [80 $(m\cdot s)^{1/2}$ to 350 $(m\cdot s)^{1/2}$] defines a "Standard Response Sprinkler and an RTI equal to or less than 90 $(ft\cdot s)^{1/2}$ [50 $(m\cdot s)^{1/2}$] defines a "Quick Response Sprinkler." Preferred embodiments of the sprinkler assembly are configured as a quick response sprinkler but can be alternatively configured a standard response sprinkler. Preferred embodiments of the yoke 250 maintain the thermal response and operation of the sprinkler 10 within desired and design ranges by facilitating heat flow over the trigger 210 through the lateral access 270 of the yoke 250.

Once the thermal trigger 210 thermally responds and fractures, the yoke 250 pivots out of the fluid flow path and the seal assembly is ejected under fluid pressure and the lack of axial support. The fluid discharge or flow characteristics from the sprinkler body is defined by the internal geometry of the sprinkler including its internal passageway, inlet and outlet (the orifice). As is known in the art, the K-factor of a sprinkler is defined as $K=Q/P^{1/2}$, where Q represents the flow rate (in gallons/min GPM) of water from the outlet of the internal passage through the sprinkler body and P represents the pressure (in pounds per square inch (psi.)) of water or firefighting fluid fed into the inlet end of the internal passageway through the sprinkler body. Generally, the discharge characteristics of the sprinkler body define a preferred nominal K-factor in a range of 3 $[GPM/(psi)^{1/2}]$ to 50 $[GPM/(psi)^{1/2}]$. Preferred embodiments of the sprinkler body define a nominal K-factor which preferably ranges from a nominal 3.0 $[GPM/(psi)^{1/2}]$ to 14.0 $[GPM/(psi)^{1/2}]$. More preferably, the sprinkler body defines a K-factor of any one of 3.0 $[GPM/(psi)^{1/2}]$; 4.0 $[GPM/(psi)^{1/2}]$; 4.2 $[GPM/(psi)^{1/2}]$; 4.4 $[GPM/(psi)^{1/2}]$; 5.8 $[GPM/(psi)^{1/2}]$; or 8.0 $[GPM/(psi)^{1/2}]$. Alternatively, the sprinkler body can define K-factors smaller or larger than the preferred range depending upon the application. Preferred embodiments of the sprinkler assembly, when installed in its preferred horizontal position as described herein provide a preferred fluid distribution for residential fire protection. In particular, preferred embodiments of the sprinkler assembly 10 provide for a range of coverage areas that satisfy residential fire protection requirements for a given nominal operating temperature, fluid flow, fluid pressure, and/or deflector-to-ceiling position installation. Preferred embodiments of the horizontal sidewall sprinkler assembly 10 can satisfy the vertical and horizontal fluid distribution tests of industry standard UL1626 for residential fire protection sprinklers. Moreover, preferred embodiments of the sprinkler assembly in the actuated state provide sprinkler coverage areas suitable for residential fire protection, preferably in accordance with UL 1626.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An automatic fire protection sprinkler assembly comprising:
- a sprinkler frame having a body defining an inlet, an outlet and an internal passageway extending along a central sprinkler axis from the inlet to the outlet, the body including a sealing surface formed proximate the outlet;
- a fluid deflection member coupled to the sprinkler frame and spaced from the outlet;
- a sealing assembly disposed in the outlet and in fluid tight surface contact with the sealing surface of the body; and
- a trigger assembly including:
  - a thermally responsive element aligned along the central sprinkler axis with a first end seated against the sealing assembly and a second end seated between the outlet and the fluid deflection member; and
  - a yoke disposed between the sealing assembly and the fluid deflection member, the yoke having: an elongate support member having a central region centered between a pair of end portions, the pair of end portions being spaced apart from one another to define a span of the yoke, the central region being axially spaced from the span to define a height of the yoke, the central region being centered along the central axis for seating the second end of the thermally responsive element under a compressive load with the pair of end portions disposed about the thermally responsive element along a lateral axis intersecting and perpendicular to the central axis to define a heat impact region with the second end of the thermally responsive element disposed therein, the yoke radially surrounding the thermally responsive element and having a lateral access window between the central region and the pair of end portions to define a fluid flow path in fluid communication with the heat impact region and perpendicular to a plane defined by an intersection of the central and lateral axes.

2. The sprinkler assembly of claim 1, wherein the yoke includes a linear portion between the central region and each end portion, the linear portion being skewed with respect to the central axis.

3. The sprinkler assembly of claim 1, wherein the heat impact region defines a first area and the lateral access defines a second area being at least 75% of the first area.

4. The sprinkler assembly of claim 1, wherein the yoke includes a pair of cross members disposed about the elongate support member and the thermally responsive element, the pair of cross members extending across the span and parallel to the lateral axis to interconnect the end portions and surround the thermally responsive element, wherein the lateral access window comprises a pair of windows formed about the thermally responsive element, each window in the pair of windows being framed between the elongate support member and one of the cross members.

5. The sprinkler assembly of claim 4, wherein each window is circular.

6. The sprinkler assembly of claim 4, wherein each window is triangular.

7. The sprinkler assembly of claim 6, wherein the triangular window defines a maximum width being 75%-90% of the span.

8. The sprinkler assembly of claim 1, wherein the yoke includes a pair of sidewalls disposed about the elongate support member to border the heat impact region and the second end of the thermally responsive element therein, each sidewall in the pair of sidewalls having the lateral access window formed therein.

9. The sprinkler assembly of claim 8, wherein the fluid deflection member includes a first tab member and a second tab member separated from one another about a dividing plane in which the central sprinkler axis is disposed.

10. The sprinkler assembly of claim 9, wherein each of the first and second tab members of the fluid deflection member have a trailing edge and a leading edge spaced from the trailing edge such that the leading edge is further from the outlet than the trailing edge, each of the first and second tab members being symmetrical with respect to a bisecting plane that is perpendicular to and intersects the dividing plane, at least one of the first and second tab members being skewed with respect to the dividing plane.

11. The sprinkler assembly of claim 10, wherein the sprinkler frame includes a pair of frame arms spaced apart about the outlet and extending axially from the frame body, each frame arm including a terminal end formation located at a fixed distance from the outlet, the terminal end formations defining a frame void centered along the sprinkler axis with the frame void being located between the outlet and the fluid deflection member.

12. The sprinkler assembly of claim 11, wherein the thermally responsive element comprises a frangible glass bulb having a first end and a second end, each of the first and second end being located along the central sprinkler axis with the first end seated against the sealing assembly and the second end seated against the central region of the yoke.

13. The sprinkler assembly of claim 12, wherein a pair of compression members threaded into the terminal end formations engage the yoke.

14. The sprinkler assembly of claim 8, wherein the heat impact region defines a first area and each lateral access window defines a second area being less than 30% of the first area.

15. The sprinkler assembly of claim 8, wherein each lateral access window defines a diameter being 25%-30% of the span of the yoke and/or 50%-75% of the height of the yoke.

16. The sprinkler assembly of claim 15, wherein each lateral access window is coaxially aligned along an axis perpendicular to the central sprinkler axis.

17. The sprinkler assembly of claim 8, wherein each lateral access window is centered laterally on its respective sidewall.

18. The sprinkler assembly of claim 1, wherein the yoke includes a lever member to alter a center of gravity of the yoke.

19. The sprinkler assembly of claim 1, wherein the fluid deflection member includes a first tab member and a second tab member separated from one another about a dividing plane in which the central sprinkler axis is disposed.

20. The sprinkler assembly of claim 19, wherein each of the first and second tab members of the fluid deflection member have a trailing edge and a leading edge spaced from the trailing edge such that the leading edge is further from the outlet than the trailing edge, each of the first and second tab members being symmetrical with respect to a bisecting plane that is perpendicular to and intersects the dividing plane, at least one of the first and second tab members being skewed with respect to the dividing plane.

21. The sprinkler assembly of claim 20, wherein the sprinkler frame includes a pair of frame arms spaced apart about the outlet and extending axially from the body, each frame arm including a terminal end formation located at a fixed distance from the outlet, the terminal end formations defining a frame void centered along the sprinkler axis with the frame void being located between the outlet and the fluid deflection member.

22. The sprinkler assembly of claim 21, wherein the thermally responsive element comprises a frangible glass bulb having a first end and a second end, each of the first and second end being located along the central sprinkler axis with the first end seated against the sealing assembly and the second end seated against the central region of the yoke.

23. The sprinkler assembly of claim 22, wherein a pair of compression members threaded into the terminal end formations engage the yoke.

24. An automatic fire protection sprinkler assembly comprising:

a sprinkler frame having a body defining an inlet, an outlet and an internal passageway extending along a central sprinkler axis from the inlet to the outlet, the body including a sealing surface formed proximate the outlet;

a fluid deflection member coupled to the sprinkler frame and spaced from the outlet;

a sealing assembly disposed in the outlet and in fluid tight surface contact with the sealing surface of the body; and a trigger assembly including:

a thermally responsive element aligned along the central sprinkler axis with a first end seated against the sealing assembly and a second end seated between the outlet and the fluid deflection member; and a yoke disposed between the sealing assembly and the fluid deflection member, wherein the yoke comprises:

an elongate support member having a central region centered between a pair of end portions, the pair of end portions being spaced apart from one another, the central region being centered along the central axis for seating the second end of the thermally responsive element under a compressive load, and a pair of sidewalls disposed about the elongate support member to border the second end of the thermally responsive element, and wherein each sidewall in the pair of sidewalls comprise a window framed therein.

25. The sprinkler assembly of claim 24, wherein the window comprises a closed form-geometry.

26. The sprinkler assembly of claim 25, wherein the closed form-geometry comprises a circle.

27. The sprinkler of assembly of claim 26, wherein a diameter of the circle comprises 25%-30% of a span of the sidewall.

28. The sprinkler assembly of claim 26, wherein a diameter of the circle comprises 50%-75% of a height of the sidewall.

29. The sprinkler assembly of claim 26, wherein each window is centered laterally on each sidewall in the pair of sidewalls, and wherein each window is aligned with the central sprinkler axis.

* * * * *